United States Patent [19]

Diggs

[11] 4,292,535
[45] Sep. 29, 1981

[54] MODULAR CURRENT POWER APPARATUS

[76] Inventor: Richard E. Diggs, 12A Rd., Carthage, Mo. 64836

[21] Appl. No.: 183,968

[22] Filed: Sep. 3, 1980

Related U.S. Application Data

[63] Continuation-in-part of Ser. No. 692,378, Jun. 3, 1976, abandoned.

[51] Int. Cl.³ ............................................. F01D 23/00
[52] U.S. Cl. .......................................... 290/54; 416/8
[58] Field of Search ................... 290/54, 42; 416/8, 7; 290/43, 53

[56] References Cited

U.S. PATENT DOCUMENTS

| | | | |
|---|---|---|---|
| 327,888 | 10/1888 | Main | 416/8 |
| 1,355,386 | 10/1920 | Christensen | 416/8 |

FOREIGN PATENT DOCUMENTS

| | | | |
|---|---|---|---|
| 22885 | of 0000 | Fed. Rep. of Germany | 416/7 |
| 188728 | of 1923 | United Kingdom | 415/5 |

Primary Examiner—J. D. Miller
Assistant Examiner—D. L. Rebsch
Attorney, Agent, or Firm—Shoemaker and Mattare, Ltd.

[57] ABSTRACT

A modular apparatus which converts the work of water flowing in a waterway into usable power. The apparatus comprises a plurality of modules, and each module comprises water contacting blades which are impacted by the water a plurality of times as the water flows through the module. The blades are connected to means for driving power generating equipment to convert the water flow work into usable power.

4 Claims, 7 Drawing Figures

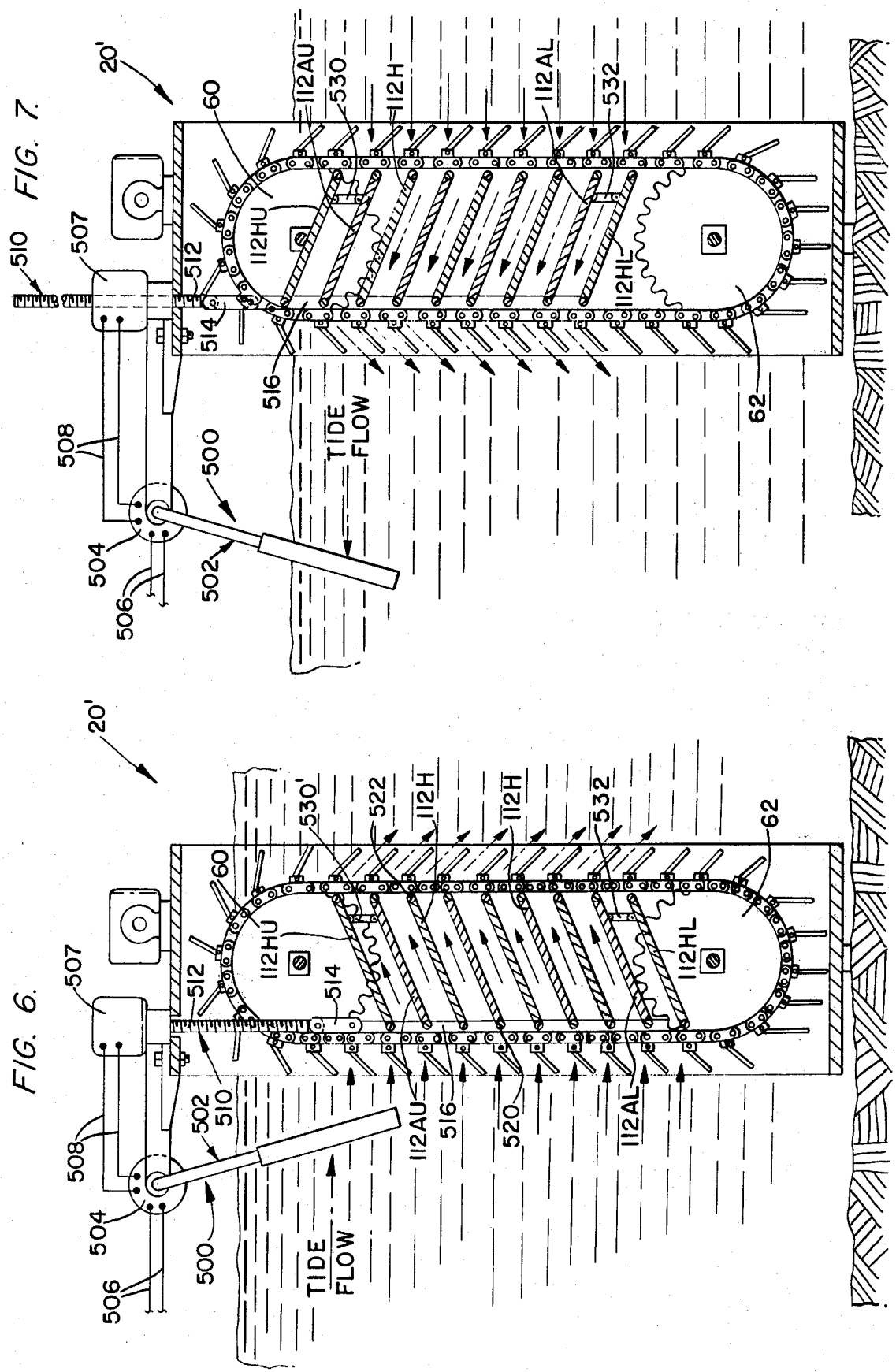

MODULAR CURRENT POWER APPARATUS

This is a Continuation in Part of application Ser. No. 692,378, filed June 3, 1976, now abandoned.

BACKGROUND OF THE INVENTION

The present invention relates to prime movers, and, more particularly, to prime movers which convert water movement into power.

Ocean tides and water movement through inland waterways both represent water flows which, if properly tapped, can be converted into millions of horsepower of usable power. However, for many reasons, this vast source of power has, heretofore, remained virtually unexploited.

Devices for converting water movement into usable power are known, with the most evident of these devices being the hydroelectric power plants associated with waterfalls and dams. Known also are devices for turning flow of water in streams and other inland waterways into power. Furthermore, there is now increasing interest in transforming tidal currents, as well as the tides themselves, into usable power. However, these known devices have several disadvantages, such as: remoteness of the location from the power user; interruption of flow of the waterway; interruption of vehicular traffic patterns on the waterway; and marring or detracting from the aesthetics of the environment.

While the above drawbacks are important, replacement of parts can be a very serious disadvantage to known devices. This disadvantage can be especially onerous in systems located in very deep water where divers must be employed. Costs in labor, materials and downtime can cause repair of such systems to rapidly become enormous, with the resulting inhibitive effect on installation of such devices. Furthermore, due to the unitary nature of most known devices, failure of one component part thereof may require the shutdown of the entire device to allow that single component part to be repaired. These factors alone have impeded continued development of such water flow work conversion devices as viable power sources.

Yet a further difficulty with known devices results because of the inefficient manner with which they utilize available water flow work. The overshot waterwheel is a good example of devices which inefficiently utilize water flow work to produce usable power. In the overshot waterwheel, only a few of the blades thereof are contacted by the flowing water during each cycle of the wheel, and furthermore, the blades are impacted by the water only once per cycle. Other devices using paddles, or blades, immersed in a waterway are similarly deficient in the complete utilization of the elements thereof. Furthermore, the devices with surface located elements are susceptible to wind and weather damage, thus creating other problems.

Furthermore, most known devices are unitary, that is, they are formed of a single wall or supporting structure. Thus, each device must be especially made for a particular location and/or waterway shape and depth. This "customizing" represents a costly and inefficient method of construction and virtually eliminates any possibility of mass producing the devices or the component parts thereof.

The device embodying the present invention is modular, with each module having the means for converting the flow work of flowing water into power by cyclically operating means which are arranged to be contacted by the water a plurality of times during each cycle thereof.

It is here noted that the terms "flow work" and "flow energy" are used interchangeably in this disclosure to refer to the work performed as fluid flows into or out of a system.

SUMMARY OF THE INVENTION

The apparatus embodying the present invention efficiently utilizes flow work of flowing water which passes therethrough and is amenable to easy construction and repair.

The apparatus comprises a plurality of modules located in a waterway, with each module including a frame mounted on a standard which is supported in the bed of the waterway. The modules are detachably mounted on the standard and can be stacked to any desired height or strung together for any desired length.

Each module has a multiplicity of elongate blades or paddles mounted on a vertically oriented endless chain to have the longitudinal axis thereof positioned transversely of the flow direction of the water. The chain is trained around vertically spaced sprocket wheels, at least one of which is connected to a power generating device to operate that power generating device as the water flows past, and through, the module.

The chain comprises an upstream reach and a downstream reach and the blades are pivotally connected to the chain to tilt downwardly due to the flow pressure in the upstream reach, and downwardly due to the weight of the blades in the downstream reach. Inclined guide vanes extend through the module in the general water flow direction, and define a plurality of raceways for the water passing through the module. The raceways direct the water from the upstream reach of the chain, after the water has contacted the blades, to the downstream reach to impact the downwardly tilted blades on that downstream reach.

Thus, the water contacts each of the blades a plurality of times during each cycle of the chain, thereby impulsing each paddle a pluarlity of times during each cycle. The power output of the device is thus increased over known devices which have the blades or paddles thereof impulsed only once per cycle.

All of the components of each module, and indeed the module itself, can be detachably mounted to facilitate easy removal for servicing or replacement.

Suitable locks or other means can be used in conjunction with the device to enable waterway traffic to bypass the modules. Alternatively, the length of the module chain can be selected to provide by-pass paths around the modules. Therefore, using the apparatus of the present invention, waterway traffic, as well as the waterway itself, can remain essentially interrupted. Furthermore, by immersing the modules in the water, the aesthetics of the environment surrounding the waterway are essentially undisturbed.

OBJECTS OF THE INVENTION

It is therefore a main object of the present invention to utilize water flowing through or past a device a plurality of times during each cycle of that device.

It is another object of the present invention to provide a device which is adaptable to a wide variety of waterway sizes and locations.

It is yet a further object of the present invention to provide a device for converting water movement into usable power which is easily assembled, disassembled and serviced.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 6 and 7 are elevation views of an alternative embodiment of the apparatus embodying the teachings of the present invention.

DETAILED DESCRIPTION OF THE PREFERRED EMBODIMENT

Figure 1:
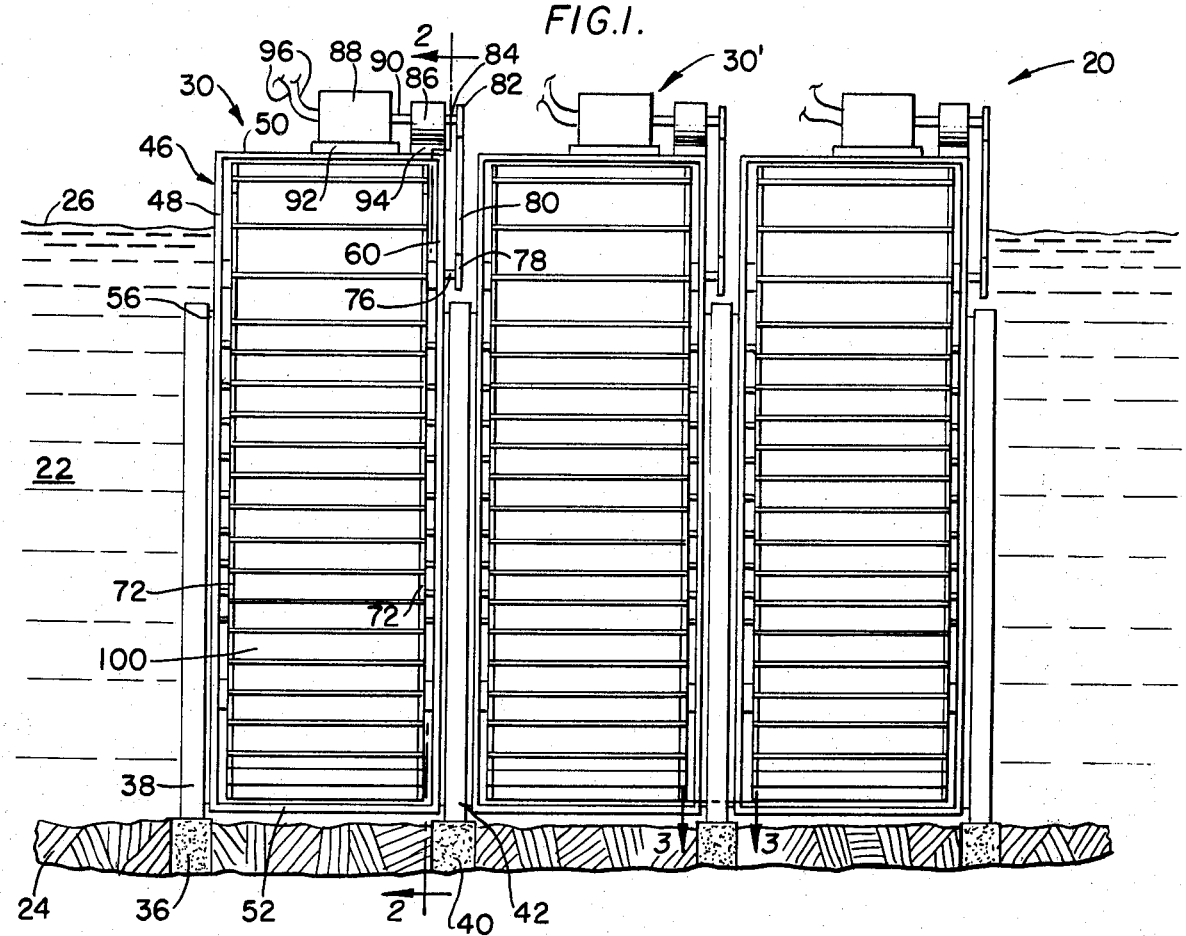
FIG. 1 is a side elevation view of the apparatus embodying the teachings of the present invention.

Shown in FIG. 1 is an apparatus 20 for converting water currents into electrical power. The apparatus is shown to be located and immersed in a body of water 22 having a bed 24 and a surface 26. The body of water can be an estuary, a bay, a river, or any other like body of water wherein the water flow velocity exists in one or both directions as in tidal action. The apparatus is modular and comprises a plurality of modules, such as module 30. Using any suitable underwater procedure, the modules may be set individually, or ganged together in groups or chains having a length of up to several miles. The height of each module can be selected according to water depth at ebb and/or neap tides, so that the modules extend above the water for the desired height at any given time. Alternatively, modules can be stacked to the desired height.

Figure 3:
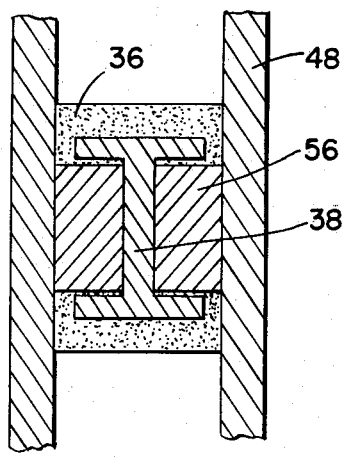
FIG. 3 is a plan view taken along line 3—3 of FIG. 1.

As the modules are essentially identical, only one module will be described. The module 30 comprises a pier 36 embedded and secured in the bed 24 and supporting a standard 38 thereon. An identical pier 40 supports a standard 42 thereon which is common to module 30 and an adjacent module 30'. Detachably connected to and supported by the standards is module frame 46 comprised of vertical stanchions 48 and horizontal top and bottom cross braces 50 and 52, respectively. The frame 46 is detachably attached to the standards by reinforcement members 56. As best shown in FIG. 3, the standards are preferably I-beams mounted in an upright manner on the support piers, with the reinforcement members 56 slidably interpositioned between the legs of the I-beam. Other configurations can be used however, and the I-beam is merely the preferred embodiment. Further support for the module is provided by an anchor cable 58 attached by cable connections at one end thereof to the frame and at the other end thereof to a thrust anchor 59 mounted in bed 24. Being slidably and detachably mounted on the standards, the frame, and hence the entire module, can be easily removed to facilitate repairs. In such cases, a flow diverting dam may be inserted into the standards in place of the module to divert water flow to adjacent moduels. The dam can be a simple blank flat sheet which is slidably received in the standards. Alternatively, the module standards can be left vacant, if so desired. Such slidable connections result in expeditions and easy repair and/or complete replacement of the major elements of the module, or even the entire module itself. Thus, failure of one module does not interrupt the operation of the entire chain of modules, and power generation is essentially continuous.

Figure 2:
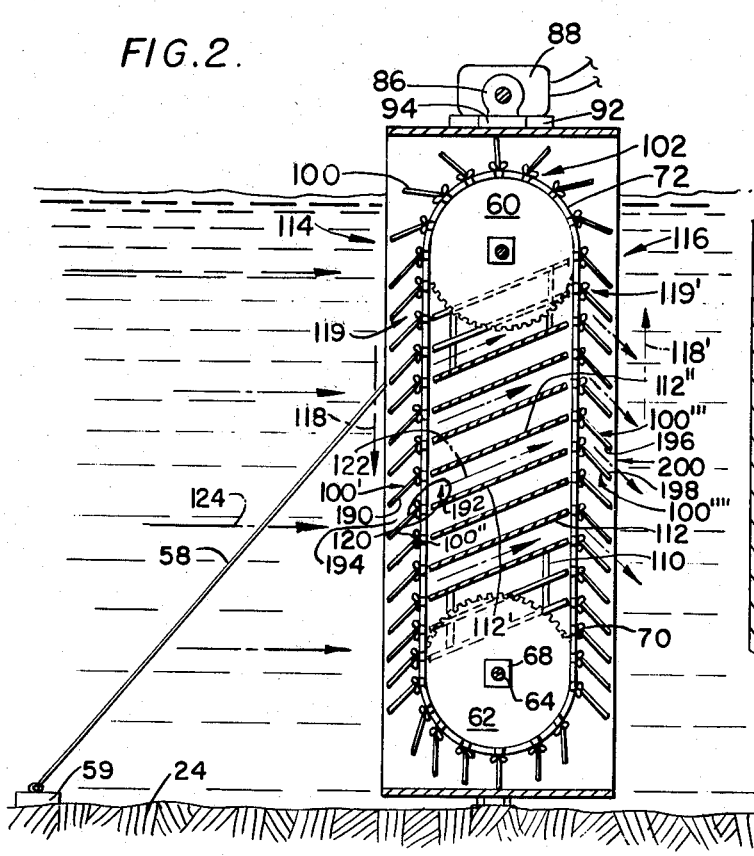
FIG. 2 is an end elevation view taken along line 2—2 of FIG. 1.

As shown in FIGS. 1 and 2, pairs of top and bottom sprocket wheels 60 and 62 are vertically spaced from one another and are rotatably and detachably mounted on the frame by shafts, such as shaft 64, rotatably secured to the frame by bearing housings, such as adjustable and sealed bearing housing 68, on both sides of the shaft. The sprocket wheels comprise the usual sprocket teeth, such as teeth 70 on the outer peripheral edge thereof, and have a pair of vertically extending endless chains, such as link chain 72, trained therearound for turning the sprocket wheels in response to movement of the water, as will be later discussed. As shown, there is a chain on each side of the module. While any number of chains can be used, two is the preferred number. Being detachably mounted to the frame, the sprocket wheels, like all of the other elements of the module, can be easily removed for repair and/or replacement. Such repair and/or replacement can even be performed in situ by divers.

Connected to the top sprocket wheel 60 for rotation therewith is a stub shaft 76 supporting a pulley 78 around which is trained an endless belt 80. The belt 80 is trained around, and drives, a pulley 82 which is secured to one end of a stub shaft 84 for turning that stub shaft in response to rotation of sprocket wheel 60. The stub shaft 84 is connected at its other end to a speed controlling unit 86 associated with a power producing device 88, such as a dynamo, via yet another stub or connecting shaft 90. The power generating device 88 is detachably mounted on frame member 50 by a mount 92, and the speed controller is detachably mounted on the frame member 50 by a mount 94. As with the other elements, removal for repair and/or replacement of these elements is expeditiously accomplished due to the detachable nature of the mountings. Power is withdrawn from the device 88 via leads 96 and conducted to suitable usage or storage devices, as desired. Any suitable power generating equipment can be used, and can be connected to either sprocket wheel, and the disclosure in FIG. 1 is only an example of the many possible configurations. Suitable equipment can also be used to enable that power generating equipment to produce either AC or DC power at any suitable power level or configuration.

Coupled to the chain 72 is a multiplicity of overlapping blades 100 which are elongate and each pivotally connected at the ends thereof to the chains 72 by connecting means 102. The blades, or paddles, preferably have the longitudinal axis thereof oriented to be transverse of the water flow direction, and will be more fully discussed below.

Mounted on the frame 46 are a plurality of vertical stringer members 110 which mount a plurality of raceway-defining guide vanes 112 on the frame 46. As shown in FIG. 2, the guide vanes extend transversely across the module from a point adjacent one reach of the chain to a point adjacent the other reach of the chain. Thus, for the water flow direction indicated in FIG. 2, the upstream side of the module 30 is indicated by the reference numeral 114, and the downstream side thereof is indicated by the reference numeral 116. Correspondingly, the chain will move in the direction indicated by arrows 118 and 118' and have a downward reach 119 and an upward reach 119'. Thus, in this example, guide vanes 112' and 112" define a raceway 120 through which water passes in the direction of arrow 122 when the water current is flowing in the direction of arrow 124. Of course, the above definitions are reversed when the water flow direction is reversed from that direction shown in FIG. 2.

Figure 4:
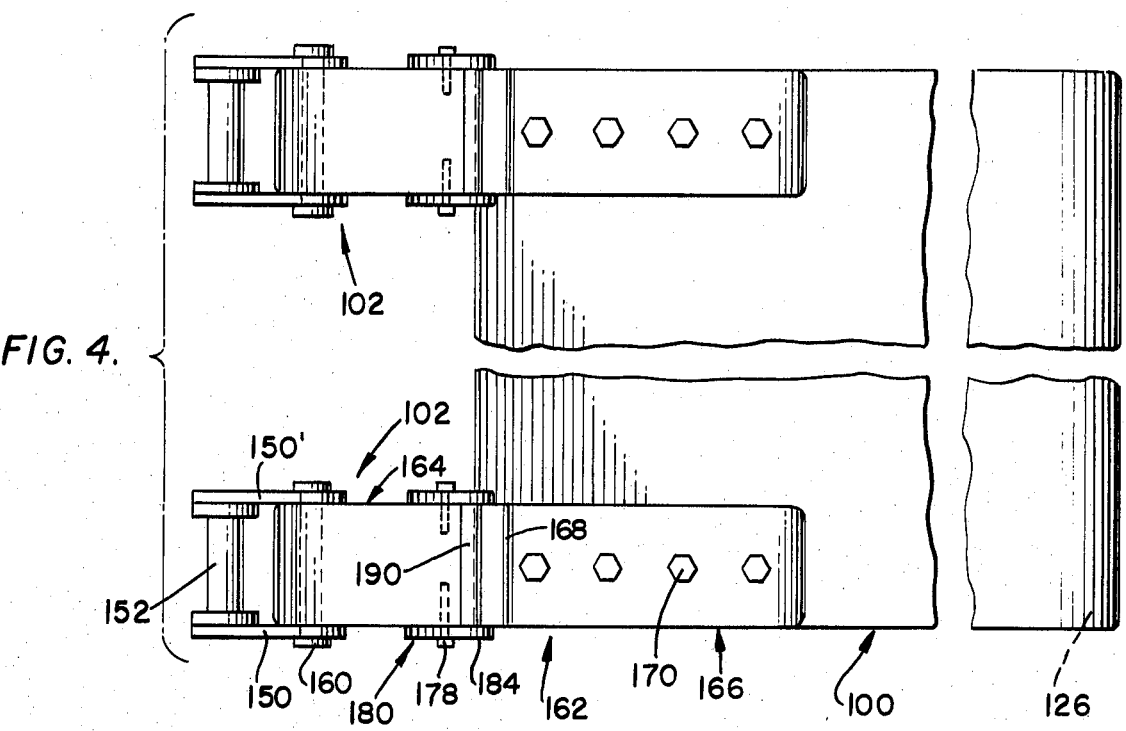
FIG. 4 is a plan view of a blade used in conjunction with the device embodying the teachings of the present invention.
Figure 5:
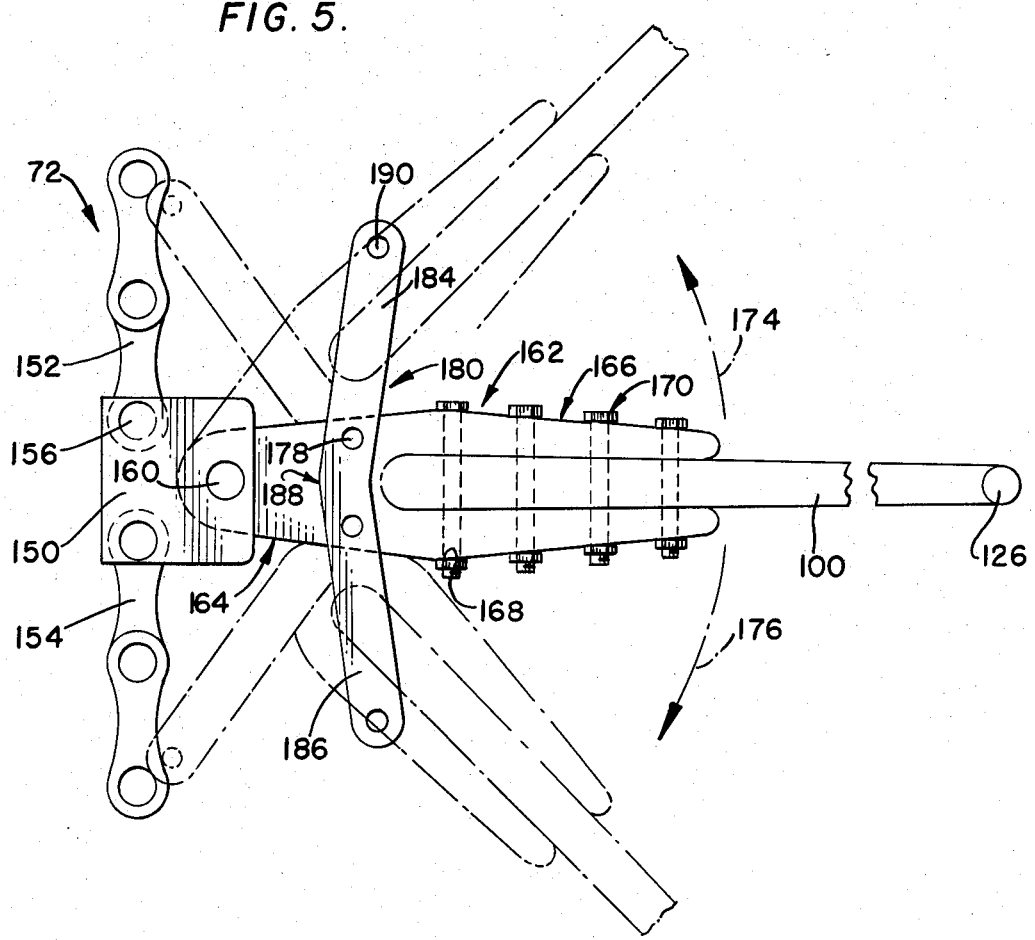
FIG. 5 is an elevation view of the blade shown in FIG. 4.

The blades are best shown in FIGS. 4 and 5, and each comprises a stiffening rod 126 extending longitudinally thereof at the distal end thereof, while being fixed to the attaching means 102 at the proximal end thereof. The stiffening rod adds weight to the blade, and as will be later discussed, the weight of the blade is utilized to develop the proper inlet and outlet portions for the raceways. The blades are shown to be essentially flat and rectangular, but can assume other suitable shapes and geometries.

The attaching means 102 comprises a pair of pivot links 150 and 150', each interjoining two adjacent links 152 and 154 of the chain 72 by link pins, such as link pin 156. As shown in FIG. 5, each pivot link has attached thereto by a pivot pin 160 a clevis 162 which is in the form of a dual frusto-conical body with proximally sloped link attaching section 164 and distally sloped blade attaching section 166 joined to form a crown 168 near the midpoint of the clevis. A plurality of bolts which act as clevis pins, such as pin 170, attach the blade 100 to the clevis 162. The clevis allows the blade 100 to rock, or pivot about pivot pin 160 in the direction of arrows 174 and 176 to assume the tilted and extended positions shown in FIG. 2, and in phantom and solid lines in FIG. 5.

Attached to the link attaching section 164 of each clevis by pins, such as pin 178, is a stop arm 180 which is V-shaped, with the vertex thereof disposed toward the pivot pin 160. Each stop arm comprises an upper section 184 and a lower section 186 joined at the vertex 188 of the arm, and elongate link engaging stop pins 190 in the outer ends of each section. As shown in FIG. 5, the link engaging stop pins contact corresponding links of the chain 72 to constrain the tilting movement of the blade 100 within desired limits. The angle between the sections of the arm 180 is adjusted to permit the desired amount of tilting of the blades 100. However, the tilting is preferably held to 45 degrees in both the upward and the downward directions. The pins permit easy removal of the blades and the component parts of the connecting means for easy repair thereof.

Having described the elements comprising each of the modules 30, the operation thereof will now be described with reference to FIG. 2. It is seen in FIG. 2 that blades 100 form entranceways and exitways for the raceways 120. Thus, for example, subsurface 190 and top surface 192 of adjacent blades 100' and 100", respectively, define an entranceway 194 for raceway 120, and subsurface 196 and top surface 198 of adjacent blades 100''' and 100'''', respectively, form exitway 200 for the raceway 120. As the water flows in the direction indicated by arrow 124, it impinges on the blade top surfaces, such as top surface 192 of blade 100", to drive chain 72 downward in the downward reach 119 of that chain, which, of course, causes the upward reach 119' to move upward. The water is deflected by the surfaces 190 and 192 into the raceway 120. The water exiting from that raceway impinges upon the subsurfaces of blades 100''' and 100'''', to impulse the chain 72 upward in the upward reach 119' thereof, which augments the driving of the chain. As the chain moves, it drives the sprocket wheels, which, in turn, drive the power generating equipment located on top of the modules.

The chain will be driven in the opposite direction when the current flow direction is reversed from that shown in FIG. 2. As the blades are pivotally connected to the chain by connecting means 102, they will tilt to accommodate any flow direction, even one which is skewed with respect to the modules. Thus, the modules can be erected in the most advantageous and desirable location on the bed 24 and still operate efficiently. The inclination of the raceways can also be adjusted in accordance with various conditions as well. The shape, as well as the weight of the blades and stiffening rods 126, can also be adjusted as desired. Thus, it is seen that the blades receive at least two series of impulses from the water passing through the module for each cycle of the chain. Therefore, power production of the apparatus 20 exceeds that of known current power devices which receive only one series of impulses per cycle. Furthermore, nearly all of the blades are used during each cycle of the chain, thereby making maximum use of the elements of the device.

As the chain 72 moves, the blades assume various orientations with respect to that chain, which orientations are constrained according to the settings of the various stop arms, as above discussed. Thus, for example, blade 100' will be tilted downwardly in the downward and upward reaches of the chain due to the force of the water current in the upstream side of the module, and due to the weight of the stiffening rod 126 when the blade is located in the downstream side of the module. As the blades move around the sprocket wheels, they are upset so that the blades change respective positions, and the top surface thereof on one side of the module becomes the bottom surface thereof on the other side of the module. This reduces wear on the blade surfaces. As shown in FIG. 2, the clearance space between the sprocket wheels and the frame members is sufficient so that the blade do not contact the frame, even when those blades are fully extended in their repose positions at the top and bottom of the chain path.

All of the elements of each of the modules are detachable, and even the module frames themselves can be slidably mounted on the standards so that the removal of replacement of the elements, or even the entire module, can easily be effected. Such features result in reducing downtime of the apparatus to extremely low values as compared to known devices. Such exchangeable features of the apparatus also enable expeditious repairs on equipment located far beneath the surface of the water. It is even possible, by using suitable guides, to replace some of the equipment, especially the top mounted power generating equipment, from above the surface of the water.

An alternative embodiment of a module 20' wherein internal directional flow vanes 112H are movably mounted on the frame. The vanes 112H are pitched from left to right or up to down or vice versa to maximize energy production by taking full advantage of the direction of flow.

As shown in FIGS. 6 and 7, a tidal current direction sensing means 500 is mounted on the frame of the apparatus. The direction sensing means includes a movable pivot arm 502 having one part thereof submerged and being connected to sensor means 504. The sensor means 504 is powered from a source (not shown) via leads 506 and have the output thereof transmitted to a motor 507 via leads 508.

The motor 506 drives a jack screw 510 which includes a threaded shaft 512 connected at one end thereof to a link 514. The link 514 is connected to a drive bar 516 which extends longitudinally of the frame. As seen by comparing FIG. 6 to FIG. 7, movement of the pivot arm 502, in reaction to a change in direction of tidal current flow, is translated into upward or downward movement of the threaded shaft 512 by the motor 507. This upward or downward movement of the threaded shaft results in corresponding upward and downward movement of the drive bar 516.

The vanes 112H are connected at one end thereof to the drive bar by pivot pins 520. The other ends of the vanes are connected to the frame by pivot pins 522. Thus, upward movement of the drive bar results in upward pivotal movement of the vanes, as seen by comparing FIGS. 6 and 7. Because upper vane 112HU and lower vane 112HL are closely proximate the sprocket wheels 60 and 62, respectively, these vanes are fixed by links 530 and 532, respectively, to adjacent vanes 112AU and 112AL instead of being pivotally fixed to the frame as are the other vanes. The location and arrangement of vanes 112HU and 112HL are selected to permit unobstructed operation of those vanes and of the sprocket wheels.

By using the apparatus 20' maximum use is made of both ebb and flood tide tidal currents. A limit switch can be included on the motor 507, if desired.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. Apparatus for converting water movement from one to two opposing directions into usable power comprising:

a plurality of modules, each module including:

a supporting structure mounted on the bed of a waterway so that water flows from an upstream side of said supporting surface to a downstream side thereof, said supporting structure including a pair of spaced piers embedded in the bed of the waterway, a pair of standards fixed to said piers to extend vertically upwards therefrom, a module frame detachably connected to said standards, said module frame including a pair of vertical stanchions each slidably attached to one of said vertical standards, a top frame member connected to said stanchions and a bottom frame member connected to said stanchions, an anchor cable attached to said frame and a thrust anchor embedded in the waterway bed at a location spaced from said supporting structure, said anchor cable connecting said supporting structure to said thrust anchor to support said structure against force generated thereon by water moving through the waterway;

a sprocket wheel rotatably mounted on said supporting structure;

a power generating means mounted on said supporting structure and connected to said sprocket wheel to be operated by rotation of said sprocket wheel, said power generating means including a dynamo and a speed controlling means connecting said sprocket wheel to said dynamo;

an endless chain trained around said sprocket wheel to define an elongate loop having a longitudinal axis which is oriented to be essentially vertical so that said chain has an upstream reach located adjacent said supporting structure upstream side and a downstream reach located adjacent said supporting structure downstream side, said chain including a plurality of pivotally connected chain links;

a multiplicity of planar guide vanes movably mounted on said supporting structure to extend transversely across said supporting structure from a point immediately adjacent said upstream reach to a point immediately adjacent said downstream reach to define a multiplicity of linear raceways through which water flowing through said supporting structure is conducted in a multiplicity of separate rectilinear paths through said structure from said upstream reach of said chain to said downstream reach thereof so that a substantial portion of the areas within said chain loop is subdivided into a multiplicity of separate rectilinear paths by said guide vanes;

a plurality of elongate planar blades including side and end edges and pivotally connected to said chain by a connecting means to extend outwardly of said chain loop in both of said reaches and to a tilt downwardly in both of said chain reaches to be at an angle greater than 45° with respect to flow direction of water flowing in the body of water so that water located on said upstream side of said structure impacts said downwardly disposed blades when they are located in said upstream reach and drives said blades by impact force and water exiting from said raceways impacts said downwardly disposed blades when they are located in said downstream reach and drives said blades by impact force so that said blades are impacted by water at least twice during a single revolution of said chain about said sprocket wheel, said planar blades being arranged so an outer end edge of one blade overlaps an inner end edge of a next adjacent blade so that an imbricated orientation for said blades is defined in both of said reaches, said connecting means including a first connecting means located adjacent one of said side edges of said blade, and a second connecting means located adjacent the other side edge of said blade with each connecting means including a first coupling member connected between and to a pair of adjacent chain links, said first coupling member being located on one side edge of said chain, and further including a second coupling member located on another side edge of said chain, a plurality of coupler means each comprising a clevis and a clevis pin pivotally connecting said clevis to said connecting means so that said clevis extends outwardly of said chain, a pair of V-shaped stop arms located between said blade and said chain and fixed to side edges of each of said clevises and having link engaging means thereon including an elongate link engaging bar connected at both ends to said stop arms to engage links of said chain to constrain the pivotal movement of said coupler means, and attaching means attaching said blade to said coupler means; and guide vane moving means which includes a tidal current flow direction sensing means having a part thereof submerged, a sensor means connected to said flow direction sensing means and having an output generating means which generates an output dependent upon the direction of movement of said flow direction sensing means relative to said supporting structure, a guide vane moving means mounted on said supporting structure and connected to said output generating means to be controlled thereby, said moving means including a shaft which moves according to an output signal generated by said output means, and a drive arm connected to said shaft to be moved thereby, said guide vanes each having one end thereof pivotally connected to said drive arm and another end thereof pivotally connected to said supporting structure to be tilted in as said drive bar is moved by said shaft so that said guide vanes are moved in response to flow direction changes of water movement in a waterway.

2. The apparatus defined in claim 1 further including link arms connecting the topmost and bottommost guide vanes to adjacent vanes.

3. The apparatus defined in claim 1 wherein said guide vane moving means includes a jack screw and said shaft is threaded.

4. The apparatus of claim 2, wherein said plurality of said supporting structures are interconnected.

* * * * *